UNITED STATES PATENT OFFICE.

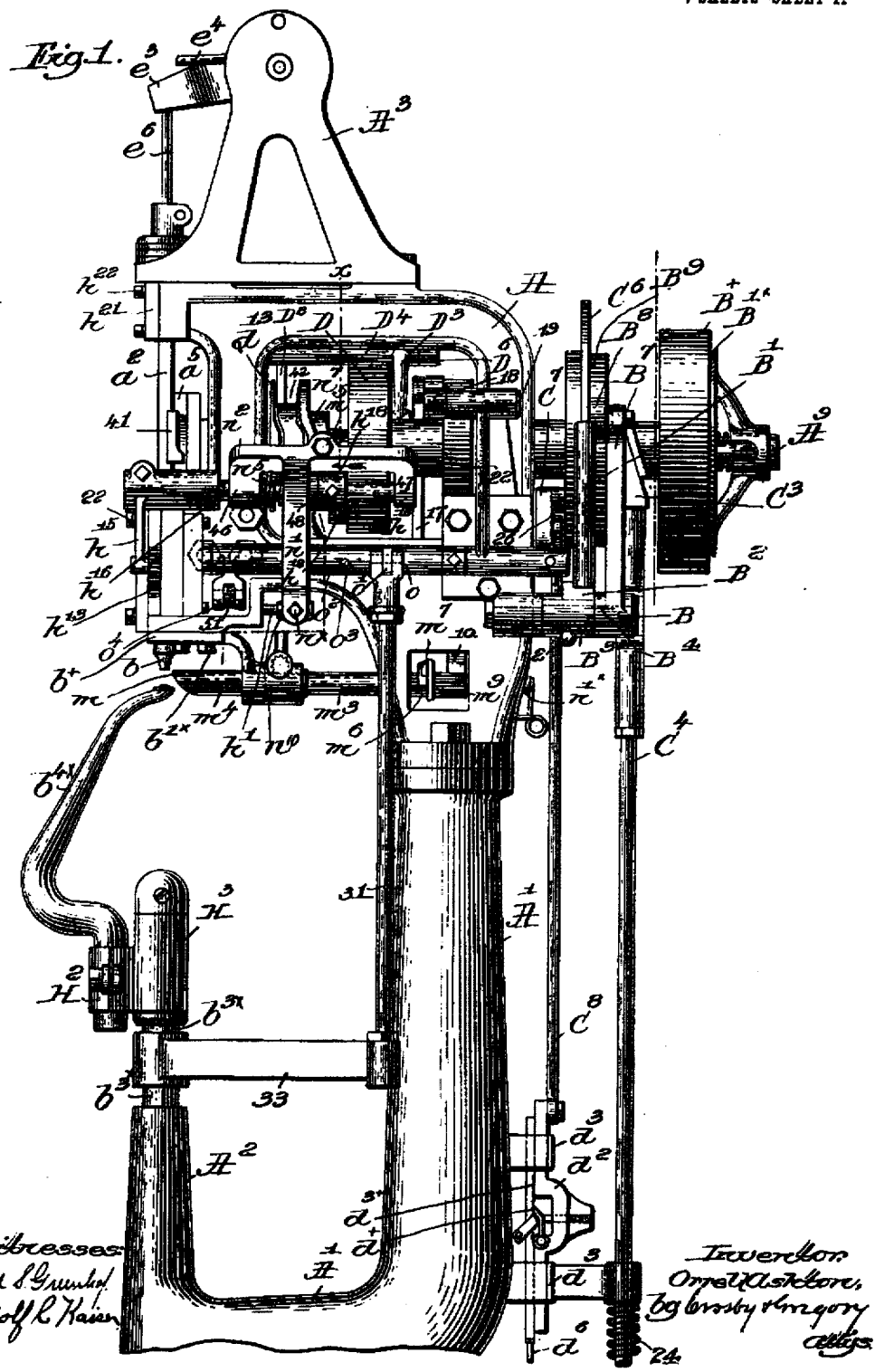

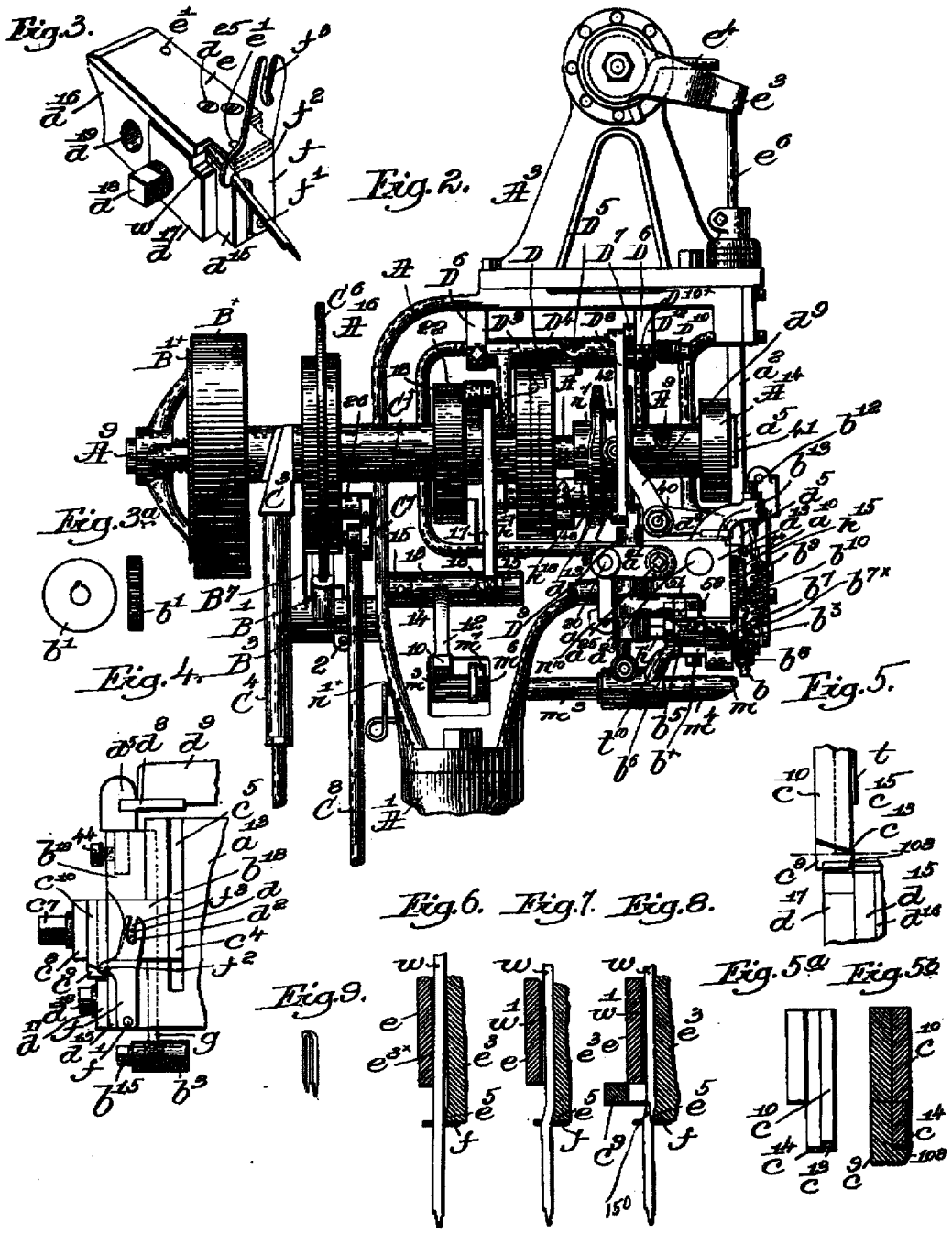

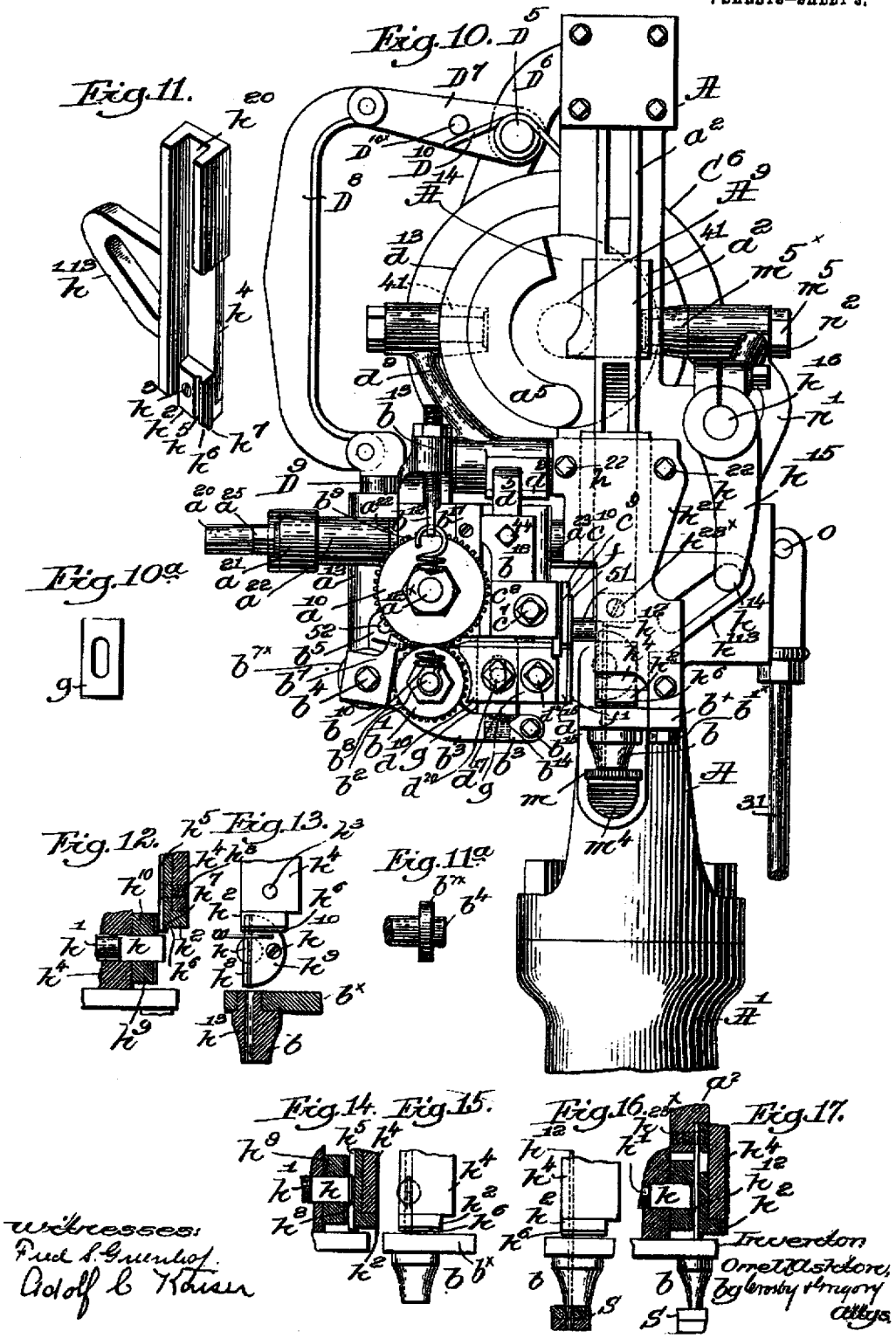

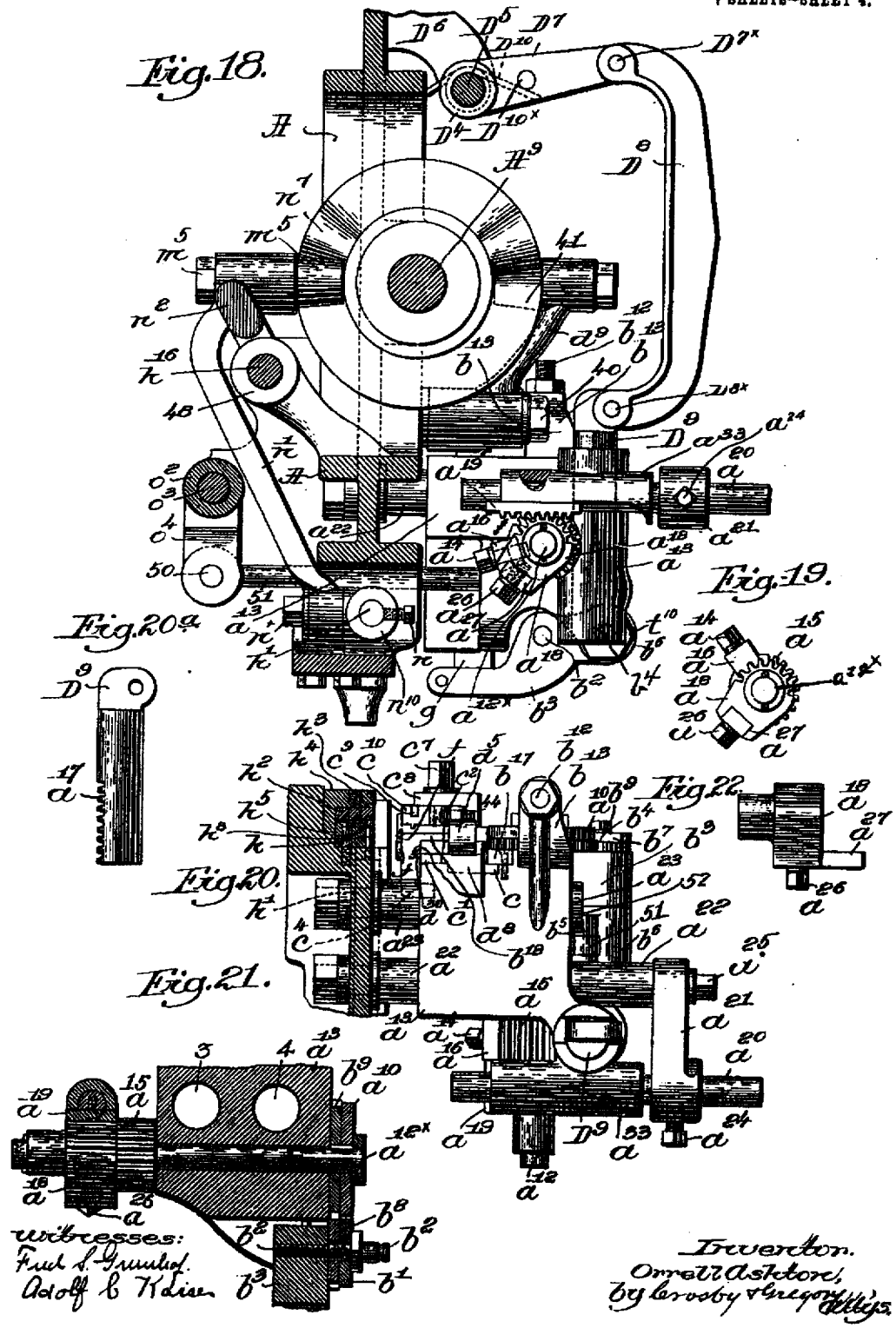

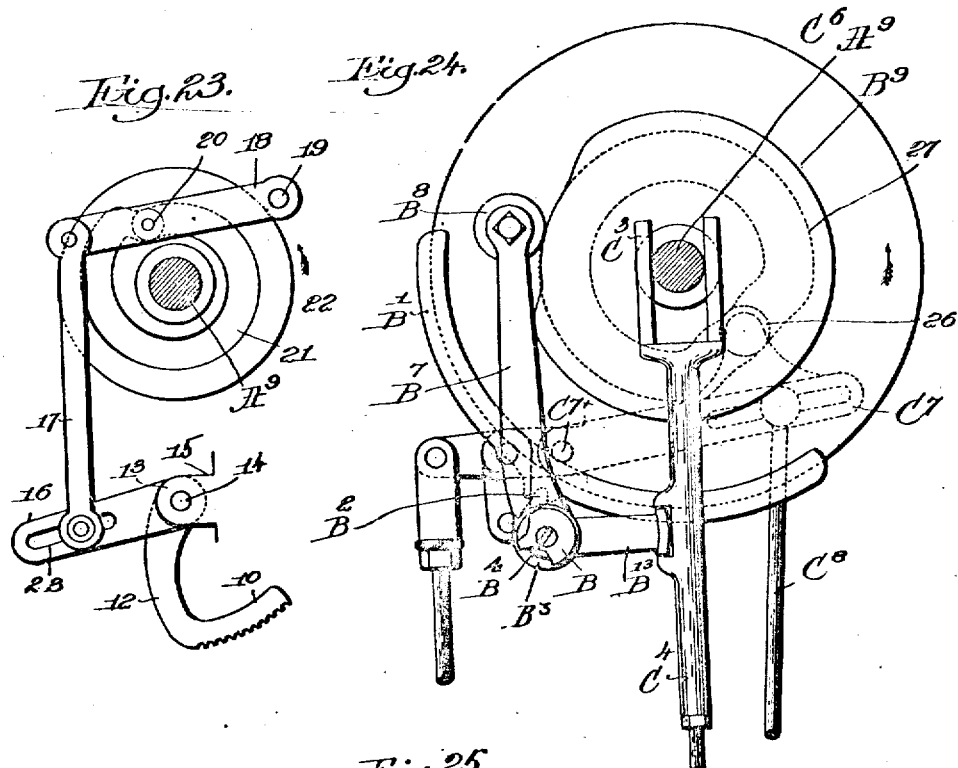

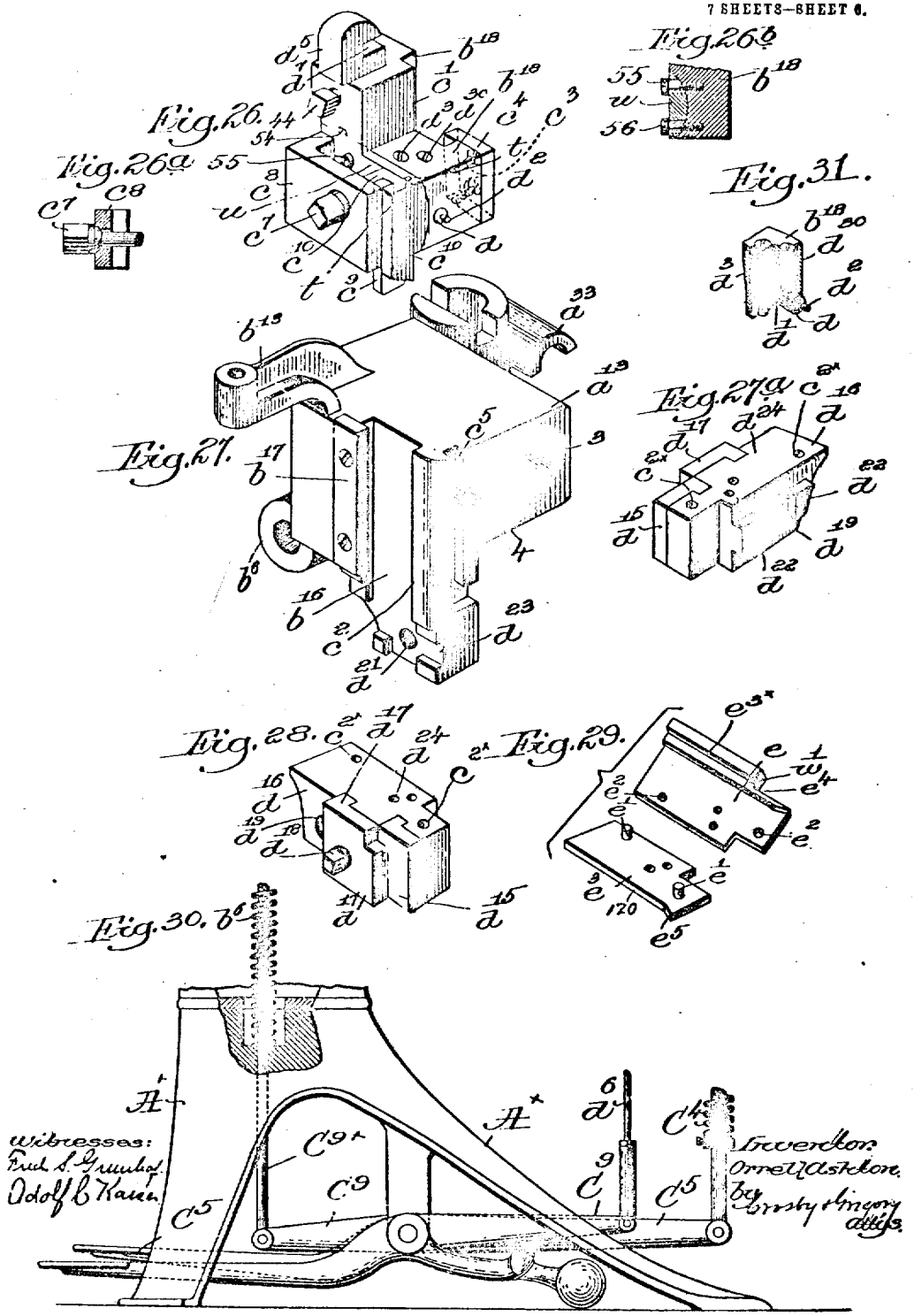

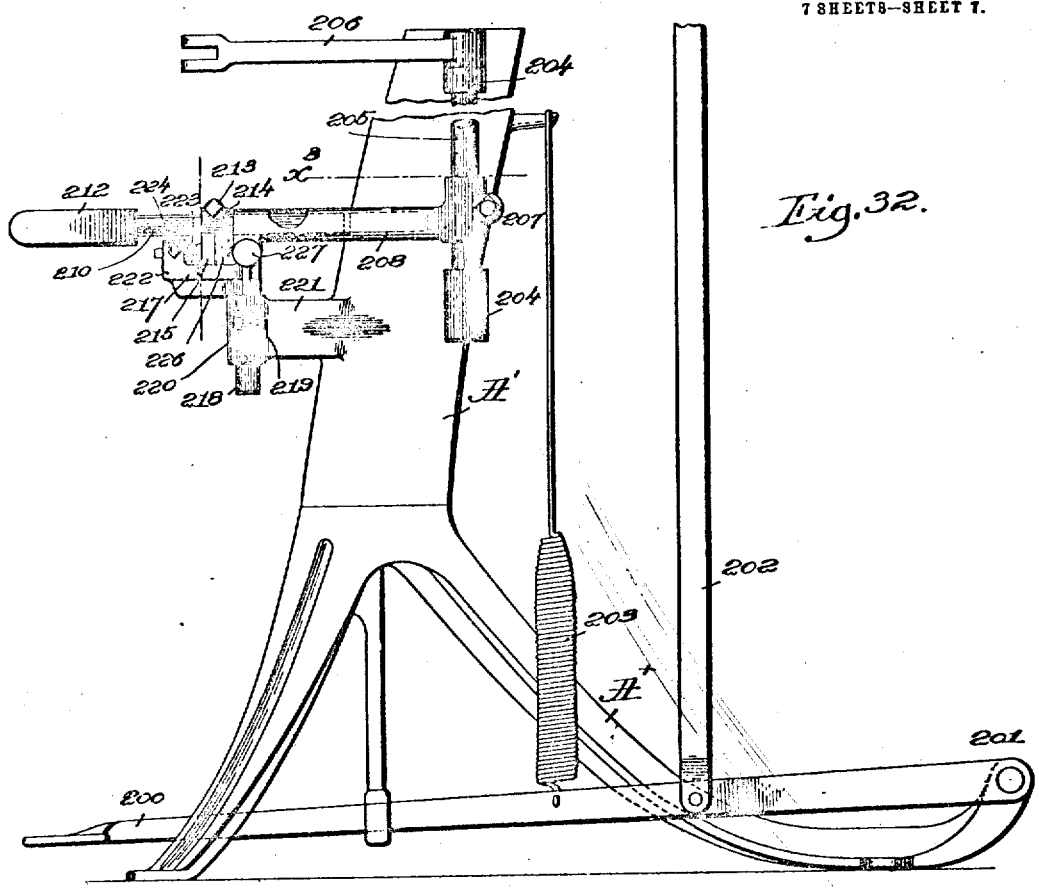
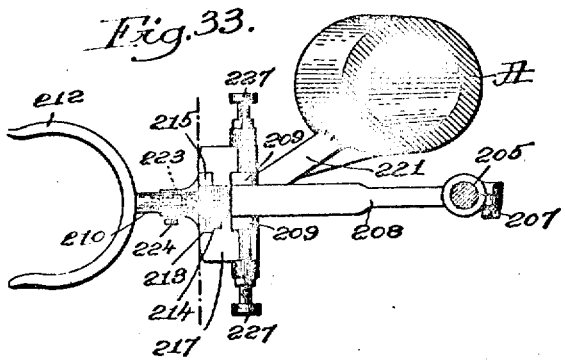

ORRELL ASHTON, OF LAWRENCE, MASSACHUSETTS, ASSIGNOR TO UNITED SHOE MACHINERY COMPANY, OF BOSTON, MASSACHUSETTS, A CORPORATION OF NEW JERSEY.

MACHINE FOR MAKING AND DRIVING STAPLES.

No. 899,093.　　　　　Specification of Letters Patent.　　　Patented Sept. 22, 1908.

Application filed May 16, 1901. Serial No. 60,528.

*To all whom it may concern:*

Be it known that I, ORRELL ASHTON, a citizen of the United States, residing at Lawrence, county of Essex, State of Massachusetts, have invented an Improvement in Machines for Making and Driving Staples, of which the following description, in connection with the accompanying drawings, is a specification, like letters on the drawings representing like parts.

This invention has for its object the production of a novel machine for making staples and driving them into leather, for boot and shoe work, or into other material for other purposes.

In the machine herein shown as embodying my invention, the wire, preferably somewhat flattened to form it into a ribbon, is taken from a reel by suitable feeding mechanism, herein shown as a pair of wheels, and is fed to the staple forming means, being bent thereby to form a staple which is then driven into the stock. The work is placed upon a yielding stock support which is self-adapting to the varying thickness of the stock and which is periodically depressed to allow the stock to be fed, as is common in machines for inserting metallic fastenings.

The wire feeding mechanism is mounted upon a sliding carriage connected with the stock support and controlled as to its position with relation to the staple forming means by the position of said stock support. In operation the carriage and wire feeding mechanism are moved away from the staple forming means during the lowering of the stock support for feeding the work and are returned towards the staple forming means as the stock support rises to clamp and caliper the stock. During the time when the stock support is descending and the carriage with its wire feeding mechanism is being moved away from the staple forming means, as well as while the carriage with its feeding mechanism is approaching the staple forming means, and the stock support is rising to clamp and caliper the stock, the wire feeding mechanism is inoperative, *i. e.* it is disengaged from the wire.

When the stock support has risen to clamp and caliper the stock, a feed varying stop, mounted loosely on the shaft to which is connected the main feeding wheel of the wire feeding mechanism, is arrested in a position which is dependent upon the thickness of the stock then calipered. This stop limits the backward or inoperative movement of the wire feeding mechanism, thereby determining the amount of wire fed.

At the end of the stroke of the feeding mechanism, to obviate any liability of the overrunning of the feeding stroke due to rapid motions of the machine, I have provided means to lock the feeding mechanism and thereby all liability of variation in length of staple which would occur from an overthrow of the feeding mechanism is avoided.

I prefer that the staple made shall be formed with its points centered, and to this end the wire is bent or offset laterally just before it is severed, so that in cutting it diagonally both points formed by the cut, that is, both the point on the severed blank and the point left on the body of the wire, shall be in the center of the width of the wire. To effect this bending or offsetting of the wire I have provided a lip to support one edge of the wire near the point where it is to be severed, and with this lip I employ what I have called a main and an auxiliary bender. The main bender meets the edge of the wire opposite the edge sustained by the lip but at one side of said lip, the side from which the wire is fed, and the auxiliary bender engages the wire at a point in advance of said lip, the benders coöperating to bend the wire slightly over said lip as a fulcrum thus offsetting the wire and holding it while the cutters act to sever the wire into staple lengths.

The auxiliary bender, hereinbefore referred to, has combined with it means whereby its stroke may be varied according to the size or width of the wire, the size of the lip and the extent of the bend desired.

The machine has suitable means for acting against the edge of the sole in which the staples are being driven, or the stock, whatever it may be, to feed the same over the work support.

This invention is not intended to be limited to the particular construction of elements hereinafter to be described, as it will be obvious that the invention herein contained might be carried out by other forms of devices which might be produced with the exercise of only mechanical skill.

Figure 1 is a partial right hand side elevation of a staple forming and driving machine containing my improvements in the best form known to me; Fig. 2 is a partial left hand side elevation of the machine shown in Fig. 1; Fig. 3 is a detail of the block containing the wire passage, stationary cutter and the auxiliary bender; Fig. 3ᵃ shows the under wire feed wheel detached; Fig. 4 is a detail showing part of the carriage and the stationary and movable cutter holding blocks; Fig. 5 is a detail showing part of the block provided with the wire passage and carrying the stationary cutter together with the movable cutter and one of the benders in position to descend to act against the edge of the wire and bend the same; Fig. 5ᵃ shows in front elevation the upper or main cutter member detached; Fig. 5ᵇ shows in vertical section the cutter and bender fitted together; Fig. 6 is a detail in horizontal section showing the wire in position to be bent or offset; Fig. 7 is a similar detail showing the wire bent laterally preparatory to the action of the cutter; Fig. 8 shows the wire as cut to form a staple blank, leaving the leading end of the wire pointed for the next blank to be formed; Fig. 9 shows a staple made from the wire so bent and cut; Fig. 10 is a partial front elevation of the machine on a somewhat enlarged scale; Fig. 10ᵃ shows the lever-depressing slide of the feeding mechanism; Fig. 11 is an inner side view of the outside former and its carrier; Fig. 11ᵃ shows part of the stud $b^4$; Figs. 12 and 13 represent two different views of the outside and inside formers, the wire resting on the inside former preparatory to being bent; Figs. 14 and 15 show the outside former as having operated and formed a staple, the inside former yet supporting the staple; Figs. 16 and 17 show the outside former in its lowermost position; the inside former having been retracted and the driver having operated to drive the formed staple through the nose and into the stock; Fig. 18 is a sectional detail in the line $x$, Fig. 1, looking toward the front of the machine, said figure illustrating the devices employed in the automatic measurement of the wire; Fig. 19 is a detail to be referred to, showing the feed varying stop and partial gear coöperating with it and fast on the feed shaft; Fig. 20 is a partial top or plan view of the movable or sliding carriage upon which the feeding and wire cutting mechanism is mounted, together with the staple forming means in section; Fig. 20ᵃ, a detail of the actuator $D^9$; Fig. 21 is a partial section through said carriage in the line of the axis of the shaft carrying the driving feed wheel; Fig. 22 is a side view of the feed varying stop; Fig. 23 is a detail showing the cam and devices actuated thereby to operate the shoe feeding mechanism; Fig. 24 is a detail viewing the machine from the rear, showing the cam for depressing the horn at stated periods in order that the stock may be fed; and part of the brake mechanism; Fig. 25 shows the cam employed to move the actuator for operating the feed wheels, and the staple-forming cam-groove; Fig. 26 is a detail showing the knife holder; Fig. 26ᵃ is a sectional detail showing the cap and the camp screw; Fig. 26ᵇ a sectional detail of the seat $u$ and its adjusting screws with part of the holder $b^{15}$; Fig. 27, a detail of the carriage $a^{13}$ detached; Fig. 27ᵃ, a detail showing the inner side of block $d^{16}$; Fig. 28 a detail showing detached the block forming part of the wire guide; Fig. 29 shows the cover plate of the wire guide block separated, one of the parts being partially inverted; Fig. 30 shows the lower portion of the machine broken off from Fig. 1; Fig. 31, a detail showing part of the holder $b^{15}$, its eccentric stud and its adjusting and holding means; Fig. 32 shows a modified mechanism for controlling the length of feed of the wire, the said mechanism being adapted to be manually operated; Fig. 33 is a section below the dotted line $x^3$, Fig. 32; Fig. 34 is a sectional detail showing one form of locking device to lock the knee lever.

The framework consists essentially of a head A of suitable shape to form bearings for the working parts to be described, said head being sustained on a column A′ supported by suitable feet Aˣ. The top of this head has erected upon it a suitable stand A³ containing a stud upon which is mounted a driver lever $e^3$, actuated by a suitable spring $e^4$, the force of which may be adjusted in usual manner. The end of the driver lever $e^3$ receives in it the upper end of a loose pin $e^6$, which is properly seated upon the upper end of the driver-bar $a^3$ actuated in usual manner by a lump or projection $a^5$, connected with a suitable disk A¹⁴ mounted upon the end of the main driving shaft Aˣ. The driver-bar has a driver $h^{12}$ connected therewith by a screw $h^{23×}$. This driving shaft has fixed upon it a brake wheel C⁶ with which coöperates a suitable brake B′ concaved at its face to embrace and act upon the edge of the said wheel.

The brake is shown as mounted loosely on a toe B² of a sleeve B³ clamped in suitable manner as by a clamp screw 2, see Figs. 1 and 2, on the hub of a lever B⁷ mounted on a stud B⁴ see dotted lines extended from the head, said lever having a projection B¹³, one end of which engages loosely a slide rod C¹, having at its upper end a wedge C³ which is employed to move the loose pulley B⁹ toward the fast pulley B¹⁰ on the shaft Aˣ whenever it is desired to start the machine. The rod C¹ is extended to a starting treadle C⁵ to be described.

Between the brake wheel and the head of the machine is a lever C⁷ suitably pivoted at one end, as at C⁷ˣ, see Fig. 24, on the head A, and having a roller or other stud 26 which enters a cam groove 27 in the face of the brake wheel C⁶. Said lever is slotted at its end and has adjustably connected with it a rod $C^3$ forming part of a connection between said lever and the stock support, to be described, so that when said rod is raised said stock support will be lowered or depressed.

The parts so far described and referred to by letters are found substantially in United States Patent No. 490,624, dated January 24, 1893.

The stock support $b^{4x}$, shown as a loosely revolving part carried by a spindle $b^{3x}$, fitted to slide up and down in a hollow post $A^2$ sustained by the column $A'$, the rod $C^{9x}$ connected with said spindle and joined to a suitable lever $C^9$, the spring $b^6$, see Fig. 30, surrounding said rod, the rod $d^6$ connected with the opposite end of said lever and toothed at its upper end as at $d^{3x}$ to be engaged by a suitable device $d^x$ mounted on a carriage $d^2$ free to be moved in suitable guideways $d^3$ and attached to said rod $C^3$; the treadle $C^5$ jointed at its rear end to the rod $C^4$; the arm 33 connected with the spindle $b^{3x}$, and the rod 31 attached to said arm, are and may be substantially as shown in United States Patent No. 383,455, dated May 29, 1888, with the exception of changes in shape which are immaterial.

The stock feeding wheel $m$ pivoted to turn about a vertical stud in an adjustable block $m^4$ containing a shaft $m^3$ provided at its front end with suitable bevel teeth, not shown, to engage teeth at the underside of the wheel $m$, said shaft having a suitable toothed sleeve $m^5$ loose thereon and carrying a pawl $m^7$, which engages a ratchet wheel $m^6$ fast on the shaft $m^3$ to rotate it intermittingly, and the spring pressed plug $n'^x$, are substantially as in United States Patent No. 403,835, dated May 21, 1889.

The sleeve $m^5$, see Fig. 2, of the stock feeding mechanism, is engaged by a toothed segment 10 on a lever 12 extended, see Figs. 2 and 23, from a sleeve hub 13, free to be turned about a suitable stud 14, held in ears 15 attached to the head A, said sleeve having a second arm 16 slotted, see Fig. 23, to thereby enable a link 17 to be adjustably connected therewith. Said link is in turn attached to a lever 18, pivoted on a suitable stud 19, sustained by the head, said lever having a roller or other stud 20, which enters a cam groove 21 in a cam 22 fast on the main shaft. Said cam and the parts just described actuate the stock feeding mechanism at the proper time, the length of the feed stroke being varied by adjusting the link 17 in the slot 23 of the lever 16.

The machine herein shown is adapted to be stopped with the stock support in its depressed position, and to insure this the arm $B^7$, Fig. 24, extended upwardly from the sleeve $B^3$ has attached to it a roller or other stud $B^3$ against which acts a cam $B^9$ having a depression, see left hand of Fig. 24; in which the roller may enter whenever, after the operator has removed his foot from the starting treadle $C^5$, said depression arrives opposite said roller, a spring 24 surrounding the rod $C^4$ normally acting to depress said rod when the depression in the cam $B^9$ permits it, and at the same instant the brake shoe $B'$ is thrust against the brake wheel $C^5$, substantially as provided for in said United States Patent No. 490,624, before referred to.

It will be understood that the machine will be stopped automatically whenever the foot of the operator is removed from the treadle $C^5$, but the machine can stop only at a certain defined point with relation to the position of the shaft $A^3$ and its cams.

The framework has two guide-rods $a^{22}$ and $a^{23}$ fixed thereon, see Fig. 20, on which is mounted a carriage $a^{12}$ adapted to be moved to and fro on said guide-rods by a link 51 connected at one end by a pin 52, see Fig. 2, with a lug $b^5$ rising from a hub $b^6$, see also Fig. 27, forming part of the carriage. The opposite end of the link 51 is jointed by a pin 50 to an arm $o^4$ of a rocking sleeve $o^3$ mounted to turn on a rod $o^3$, see Figs. 1 and 18. The sleeve $o^2$ has an arm $o'$ with which is jointed at $o$ the rod 31 connected with the arm 33 extended from the spindle $b^{3x}$ of the horn or stock support $b^{4x}$.

The depression of the stock support to permit the feeding of the stock, causes the carriage to be moved away from the usual driver $h^{12}$, the rising of the stock support to clamp and caliper the stock causing the carriage to be moved toward the driver.

The wire feeding mechanism is herein shown as comprising a main feed wheel $a^{10}$ and a wheel $b'$, which are mounted on the carriage $a^{13}$. The wheel $a^{10}$ which contacts with that side of the wire which is to form the outer side of the staple is substantially smooth at its periphery, so that it will not mar the staple forming material. This wheel is suitably keyed on a feed shaft $a^{12x}$, see having fixed to it by a set screw $a^{14}$, see Figs. 19 and 20, the hub of a partial gear $a^{15}$ having a stop $a^{16}$. At one side of said gear $a^{15}$ said shaft, as shown herein, serves as a pivot for a second partial gear $a^{18}$ having attached to it by a set screw $a^{26}$ a feed varying stop $a^{27}$ which is extended laterally that it may meet and arrest the stop $a^{16}$ carried by the feed shaft as said shaft is turned backwardly or in the direction of the arrow Fig. 18, toward the feed varying stop $a^{27}$.

The feed wheel $b'$, having preferably a serrated face, as represented in Fig. 3$^a$, to act upon that part of the wire which is to form the interior of the staple, is mounted loosely upon a stud $b^2$, the inner end of which is fitted into a bore of a lever $b^3$ mounted to turn freely about a stud $b^4$ see Figs. 10 and 11$^a$, extended through a hub $b^6$ of the carriage $a^{13}$, see Figs. 18 and 27, and held fixedly therein by a nut $t^{10}$. The feed wheel $b'$ is secured to a pinion $b^8$ which is engaged by a larger toothed gear $b^9$ fast on the shaft $a^{12x}$ carrying the feed wheel $a^{10}$. The teeth of the pinion $b^8$ and gear $b^9$ are of such length that the pinion and gear are always in mesh even when the feed wheels have been separated to release the wire.

The stud $b^2$ receives about it one end of a strong spiral spring $b^{10}$, the opposite end of which is connected with an adjusting rod $b^{12}$ held in an ear $b^{13}$ of the carriage $a^{13}$.

The free end of the lever $b^3$ is split, as shown, and provided as herein represented with a hole to receive an adjustable abutment $b^{14}$, shown as a steel block screwed into said lever and held in position by a suitable clamping screw $b^{15}$ inserted through the split end of the lever.

Any indentations made at the inner side of the staple by the serrated face of the wheel $b'$ are closed up by the inward bending of the wire in forming the staple, and the smooth-surfaced wheel $a^{10}$ leaves the outer side of the staple smooth.

The carriage $a^{13}$ has suitable holes 3, 4, see Fig. 21. The hole 3 receives the guide rod $a^{21}$, while the hole 4 receives the guide rod $a^{23}$, and the carriage has a partial sleeve $a^{23}$ which receives a rod $a^{20}$, which is referred to in the claims as a "positioning device". The guide rod $a^{21}$ has at one end a tapped hole to receive a screw $a^{25}$, see Fig. 20. extended through a hole in one end of a coupling bar $a^{21}$, thus connecting said bar rigidly to the stationary rod $a^{21}$. The opposite end of the coupling bar $a^{21}$ receives the rod $a^{20}$, which is fixed therein by a set-screw $a^{24}$, the adjustment of said rod in said bar enabling staples to be made having legs of exactly the same length, or differing in length, as may be desired.

The stationary rod $a^{20}$ has a connected rack bar $a^{19}$ which engages the teeth of the partial gear $a^{18}$ having the feed varying stop $a^{27}$, and as the carriage is moved toward the staple forming means the horn then rising to clamp and caliper the stock, the teeth of said gear $a^{18}$ in engagement with said rack turn the said gear, and put said stop in a variable position depending on the thickness of the stock being clamped.

The feed shaft $a^{12x}$ which supports one of the feed wire wheels carries also the gear $a^{15}$ having the stop $a^{16}$, as heretofore described, and the teeth of said gear are engaged by the rack teeth $a^{17}$ of a feed mechanism actuator $D^9$ which is shown separately in Fig. 20 and in relative position in Figs. 2, 10, 18 and 20. The actuator is moved downwardly, to rotate the feed wheels forwardly to feed the wire, by a link $D^8$ jointed to said actuator, at $D^{8x}$, said link being in turn jointed at $D^{7x}$ see Fig. 18 to an arm $D^7$ extended from a rocking sleeve $D^4$ mounted on a stud $D^5$, said sleeve having a second arm $D^3$ provided with a roll $D^2$ see Fig. 25 which enters a cam groove cut in the inner end of a cam $D$ fast on the shaft $A^3$. The cam groove for moving the said actuator $D^9$, see Fig. 25, is cut to present a narrow locking space 100 and a wider part 101, see dotted lines. The outer wall $D'$ of said cam acts to depress the actuator always for a like distance to thereby rotate the feed wheels forwardly to a defined position, and this defined position having been reached, the mechanism for actuating said feed wheels is locked by the entrance of the roller $D^2$ in the narrow space 100, to positively terminate the forward movement of the feeding mechanism so that it is impossible for the feeding movement to overrun. Such overrunning frequently occurs in all wire feeding contrivances wherein the feeding movement is derived from a pawl having a stroke more or less of which is effective in feeding, and by locking the actuator for the wire feeding mechanism it becomes possible to make staples accurately when the machine is running at high speed.

The length of the backward movement of the feeding mechanism controls the length of wire next to be fed and the backward movement of the feeding mechanism varies, according to the extent of upward movement of the actuator as will now be described.

The mechanism for moving the actuator $D^9$ upwardly is as follows:—The stud $D^5$ receives about it near one end a suitable spring $D^{10}$ which is fixed at one end with relation to the head A, the opposite end of the spring acting against a pin $D^{10x}$ extended from the arm $D^7$. Said spring acts normally to elevate the actuator $D^9$ into its starting position and turn the feeding mechanism, then released from the wire, backwardly until the stop $a^{16}$ meets the feed varying stop $a^{27}$. The spring $D^{10}$ also acts normally to move the roll $D^2$ toward the exterior cam wall $D'$ which defines the extent of feeding throw of the lever $D^3$ and $D^7$, said roll not, however, touching the entire length of said cam wall $D'$ unless the lever $D^9$ is to be operated to feed the wire for the formation of a staple of the maximum length which the machine is capable of making, the movement of said roll $D^2$ toward the wall $D'$ being determined at all other times by the contact of the moving stop $a^{16}$ on the gear $a^{15}$ with the feed varying stop $a^{27}$, the position of which is controlled by the positioning device $a^{20}$ above described, the roll $D^2$ being thus stopped more or less near the said wall $D'$ in accordance with the length of staple to be made.

It will be understood that the shaft $a^{12x}$ and the feed wheels do not rotate continuously in one direction, but are rotated intermittingly back and forth, and that the wire is fed only in the forward stroke of said feeding mechanism, said mechanism when turned backwardly being inoperative and moving over the stationary wire. The upward movement of the actuator under the action of the spring $D^{10}$ and consequently the backward movement of the feeding mechanism is arrested whenever the stop $a^{16}$ meets the feed varying stop $a^{27}$, and the feeding mechanism is immediately afterwards closed upon the wire by the spring $b^{10}$, which is permitted by means hereinafter described to move the feeding mechanism into operative position or to engage the wire.

The distance from the staple forming means at which the feeding mechanism engages the wire varies according to the thickness of the stock, and the thickness of the stock determines the position of the stop $a^{27}$, which is turned more or less by its engagement with the stationary positioning device $a^{20}$, as the carriage is moved away from the staple forming means. The roll $D^2$ is arrested from moving far enough to contact with the wall $D'$ in the wider part 101 of the cam track, so that at the next stroke of the actuator the feeding mechanism will feed the wire only the distance required by the thickness of the stock.

The stud $b^4$ has applied to it a suitable collar $b^{7x}$, see Fig. $11^a$, which forms an abutment for the rear side of the shank of the wire guide $b^7$, shown best in Figs. 2 and 10, said guide receiving the wire $w$ supplied by any usual or suitable reel.

The front face of the carriage $a^{13}$ is grooved, see Fig. 27, to form a guideway $b^{16}$, one side of which has a suitable gib $b^{17}$, said guideway receiving and said gib overlapping one end of the cutter carrier or knife holder $b^{18}$.

The knife holder, represented detached in Fig. 26, consists essentially of a block having at its rear side a projection or shoulder $c$, see Fig. 20, to enter a space behind the gib $b^{17}$, a shoulder $c'$ overlapping the edge $c^2$ of the carriage. Said block has attached to it by screws $c^3$, shown by dotted lines Fig. 26, a gib $c^4$, which enters an auxiliary guideway $c^5$ in the carriage $a^{13}$. This block is further provided with a threaded hole which receives a set screw $c^7$ passed through a hole in a clamp $c^8$, said clamp acting upon one edge of a bender $c^9$, herein represented as set into a groove in the shank of a cutter $c^{10}$. The bender is beveled at its inner edge 103, see Fig. $5^b$, and the cutter is represented as having a projection $t$ see Fig. 26 which enters a longitudinal vertical groove in an adjustable seat $u$, convexed at its rear side and resting in a concavity in the holder $b^{18}$. The convexed back of the seat $u$ has a tongue 54 extended transversely thereof which enters a groove cut in the concaved face of the holder $b^{18}$. This tongue prevents any longitudinal movement of the seat on the holder as the seat is being adjusted in said holder. The hole in the seat $u$ through which is extended the clamp screw $c^7$ is of larger bore than the diameter of said screw, and the underside of the head of the screw, see Fig. $26^a$, is cone-shaped, and enters a conical seat in the cap $c^8$, so that said screw may act properly in any adjusted position of the seat.

To adjust the seat, I have provided it with two holes which receive each an adjusting screw as 55, 56, and by turning out one of said screws and turning in the other, the seat may be tipped as may be desired to adjust the acting edges of the cutters. The lower end of the movable cutter $c^{10}$ has a stop $c^{14}$, see Figs. $5^a$ and $5^b$, in line with the cutting edge $c^{12}$ against which acts the offset ear or shoulder of the bender, said shoulder coöperating with said stop to always position the lower end of the bender accurately with relation to the acting edge of the movable cutter.

The clamp screw $c^7$ confines the cutter and bender firmly in place by one operation. The cutter and bender may be adjusted vertically in order to insure for them just the exact or proper working position, and they may also be adjusted to provide for any shortening of the cutter due to wear in grinding. The holder also has a longitudinal bore, which receives in it the shank of a connecting piece $d^5$, provided at its upper end with a head having a notch $d^7$, which receives a lip $d^8$, Figs. 2 and 10, preferably of hardened steel and carried by one arm of a rocking lever $d^9$, mounted upon a stud 40 extended from the head, said rocking lever having at its upper end a roller or other stud 41, which enters a peripheral cam groove 42 in a cam $d^{13}$, fixed to the main shaft. The connecting piece $d^5$ is united to the holder by means of a suitable set screw 44.

The cam $d^{13}$ acts through the lever $d^9$ and the connecting piece $d^5$ to reciprocate the holder $b^{18}$ and actuates the movable cutter $c^{10}$ of the wire cutting mechanism and the main member $c^9$ of the bending mechanism.

The stationary wire cutter $d^{15}$ Figs. $27^a$ and 28 is clamped between a block $d^{16}$ and a cap $d^{17}$ by means of a set screw $d^{18}$. The block $d^{15}$ has a hole $d^{19}$, which receives a set screw $d^{20}$, see Fig. 10, said set screw entering a hole $d^{21}$ in the carriage $a^{13}$, projections as $d^{22}$, see Fig. $27^a$, at the rear side of said block, entering a guideway $d^{23}$ in said carriage, said guideway being substantially at right angles to the guideway $b^{16}$ hereinbefore referred to.

The block $d^{16}$ has a threaded hole $d^{24}$ see Fig. 28 to receive a screw $d^{25}$, see Fig. 3, said screw being extended through a cover plate $e$ having at its underside a shoulder $w'$, see Figs. 7, 8 and 29, that in practice is located near the edge 120 of a plate $e^3$ to thus constitute a groove to receive and guide the wire. The plates $e$ and $e^3$ constituting the cover plate are united by registering pins $e'$ on one plate entering holes $e^2$ on the other plate and holes $c^{2x}$ of the block $d^{16}$. The plate e is notched, as at $e^4$, and is of sufficient size to receive not only the end of the bender $c^9$ but also the acting end of the wire cutter $c^{10}$.

Viewing Fig. 29, it will be noticed that the member $e^3$ of the cover plate has at or near one end a lip $e^5$, and that the edge of said member back of said lip constitutes one wall of the groove for guiding the wire, the opposite wall being formed by the shoulder $w'$.

Viewing now Fig. 6, where the wire is shown as placed in said groove, it will be noticed that the wire rests against the lip referred to, leaving a space back of said lip with which the edge of the wire acting against said lip does not contact.

The bender $c^9$ is located with relation to the groove in the cover plate as best represented in Fig. 5, and when said bender descends its beveled edge 103 acts upon the side of the wire opposite that at which it is supported by the lip referred to and at a point behind said lip, bending said wire laterally or offsetting it in the direction of its width, as best represented in Fig. 7, and thereafter in the further descent of the holder $b^{18}$, carrying the bender, the movable cutter member $c^{10}$ also carried by said holder $b^{18}$ meets the bent wire and cuts it on the full line represented in Fig. 8, leaving a notched end, the cut so made,—it being supposed that a staple has been already cut from the wire—, completing the second point for the piece of wire forming the staple next to be driven, leaving the body of the wire with its end pointed to constitute the point of one leg of the next staple to be made.

The cutter holder $b^{18}$ receives a short shaft $d$ provided at its exterior, see Fig. 31, with a worm toothed gear $d'$, and at its outer end, see also Fig. 26, with an eccentric projection $d^2$.

The worm toothed gear is engaged by the teeth of a worm screw $d^3$ mounted in said holder, see Fig. 26, said worm screw having its exposed end slotted, as herein shown, for the reception of a screw driver by which to rotate the worm screw to adjust the eccentric projection $d^2$ into the desired position, a suitable set screw $d^{30}$ holding the shaft and its eccentric projection in adjusted position.

I have combined with the block $d^{18}$ an auxiliary bender $f$, which is represented in Figs. 3, 4 and 10, as composed of a piece of thin steel pivoted at $f'$ and having a projection, notched at $f^2$, to embrace the wire, the upper end of said auxiliary bender having a cam slot $f^3$ in which is entered the eccentric projection $d^2$ hereinbefore referred to, said eccentric projection working in said slot during the descent of the holder $b^{18}$ causing said auxiliary bender to be turned about its pivot $f'$, so that the said bender acting on the edge of the wire at a short distance from the main bender $c^9$ and the lip $e^5$ bends said wire over said lip as a fulcrum, and by adjusting said eccentric projection variations in degree of the offset in the wire, see Fig. 7, preparatory to cutting the same in the diagonal line shown at 150, Fig. 8, may be had. The auxiliary bender therefore enables the wire to be offset or bent preparatory to cutting off a portion thereof to be bent into a staple, the direction of cut being such as to insure a central position for the points of the staples, leaving the pointed legs substantially alike.

Viewing Fig. 6, the wire is shown straight and at rest, and the wire beyond the lip $e^5$ is held in the notch of the auxiliary bender $f$. In this condition the bender $c^9$ is moved into the position, Fig. 8, bending the wire to conform substantially with the incline of said lip, and were it not for the auxiliary bender the entire free end of the wire would assume the angle of the incline of the lip, but the auxiliary bender prevents such movement; and further, the auxiliary bender has given to it a movement in the direction to bend the wire over the extremity of the lip $e^5$. By the use of the auxiliary bender the edges of the wire, both in front of, and behind the point of the incline of the lip, are maintained in parallel position, and they remain so until the wire is cut off diagonally as specified.

The guideway $b^{16}$ in the carriage $a^{20}$ receives below the holder $b^{18}$ a slide $g$, see Fig. 10, represented, see Fig. $10^a$, as a slotted steel plate surrounding the set screw $d^{28}$ used to confine the block $d^{18}$ to said carriage. The slide $g$ is interposed between the lower end of the holder $b^{18}$ and the abutment $b^{14}$, carried by the lever $b^3$, and the holder, as it descends to cause the bender $c^9$ to bend the wire and the cutter $c^{10}$ to cut the wire, acting through the slide $g$ depresses the lever $b^3$, thus separating the two wheels of the feeding mechanism, putting them in their inoperative position with relation to the wire. The spring $b^{10}$, see Figs. 2 and 10, connected with the stud $b^2$ and with an adjustable arm $b^{12}$, held in a boss $b^{13}$ of the frame, causes the feeding mechanism to reëngage the wire when the holder rises in the operation of the machine.

The end of the wire to be made into a staple is fed across the top of the inner former $h$, represented as an oblong piece of metal connected with a slide bar $h'$. The leading end of the wire is fed beyond the inner former for a varying distance according to the length of the staple to be made, that depending upon the thickness of the stock, and the proper length of wire having been fed and cut off forming a blank for a staple, the outer former $h^2$, shown as a piece of steel applied by a screw $h^3$, see Figs. 11 and 12, to a combined carrier and driver bar guide $h^4$, is made to descend upon and bend the wire about the inner former. The outer former is provided with a groove $h^5$ and with two like shoulders $h^6$ located just above the lower end $h^7$ of the outer former, and when said former descends the shoulders $h^6$ meet the wire at opposite sides of the inner former and bend the same downwardly about said inner former, the groove $h^5$ at such time traveling over the wire lying on the former. The staple having been formed properly, as represented in Figs. 14 and 15, the inner former is retracted, as will be described, leaving the staple in the groove $h^5$ of the former $h^2$.

The head of the machine has attached to it a block $h^9$, forming a guide which coöperates with the former $h^2$ to constitute a driver passage. The inner former having been withdrawn from the staple the driver bar $a^2$ is permitted to descend by or through the action of the spring $e^4$, causing the driver $h^{12}$, see Figs. 16 and 17, to enter the groove $h^5$ of the outer former and the groove $h^8$ in the block $h^9$ and drive the staple therefrom into the passage $h^{13}$ in the nose $b$, attached to the usual plate $b^\times$ fixed to the head A, by bolts $b'^\times$, see Fig. 1, and then into the stock S.

As represented in Fig. 11, the outer-former carrier $h^4$ has a projecting ear $h^{113}$ which receives in it a roller or other stud $h^{14}$ of a lever $h^{15}$ connected with a rock-shaft $h^{16}$, provided with an arm $h^{18}$ see Fig. 25 having a roller or other stud $h^{19}$, which enters the cam groove $h^{19\times}$, shown by full lines, in the cam hub D, fast on the main shaft. As this rock shaft is moved by said cam the roller stud $h^{14}$ working in the slot in the projection $h^{113}$ operates said outer former carrier causing it to be lowered at the proper time to bend the wire to form a staple, and then to rise and permit the incoming wire to cross the inner former. The driver bar $a^2$ is reciprocated in the guideway $h^{20}$ of the outer former carrier. The outer former carrier is kept seated in proper position in the head of the machine by a suitable cap plate $h^{21}$ through which are entered suitable set screws $h^{22}$.

The shank $h'$ of the inner former has secured to it by a screw $n$, see Fig. 18, a block $n^{10}$ having a stud $n^\times$ which receives over it the lower end of an arm $n'$, of a reciprocating lever $n^2$, said lever having suitable ears, as 46, 47, which surround loosely the shaft $h^{16}$, a suitable spring $n^5$ surrounding said shaft acting at one end upon the ear 46, while the opposite end of said spring works against one side of a bearing 48, see Figs. 1 and 18.

The arm $n'$ is provided with a roller or other stud $m^5$, which is kept by the spring $n^5$ in contact with a face cam $n^7$ carried at one side of the cam hub $d^{13}$, said cam being of such shape as to properly retract the inner former at the desired times, the spring $n^5$ acting to move the former into its operative position and to keep the said roller or other stud against the cam $n^7$.

The stock support $b^{4\times}$ has at its upper end a clenching cavity to somewhat turn the points of the staples in the desired direction either inwardly or outwardly, that depending upon the shape of the cavity and the class of stock being operated upon.

Let it be assumed that the machine is at rest with the stock support depressed below the nose or foot plate, said support occupying a variable position according to the thickness of the stock on the stock support when the last staple was driven. In this condition the holder $b^{18}$ is supposed to be down, and the slide $g$ Fig. 10 as acting on the lever $b^5$ to separate the feeding mechanism, so that the wire is released. To start the machine the operator having placed the stock on the stock support, will put his foot upon the starting treadle $C^5$, which will start the cam shaft and elevate the stock support to put the stock thereon against the nose or foot plate $b$. During this upward movement of the stock-support the carriage $a^{13}$ will be started toward the staple forming means, and the feed varying stop $a^{17}$ will be turned into its operative position where it will serve to determine the length of the staple next to be made and driven. The carriage having completed its movement toward the staple forming means, the extent of such movement being variable according to the thickness of the stock being calipered, and the feeding mechanism being released from the wire, the actuator is lifted to turn the feeding mechanism backwardly over the stationary wire until the stop $a^{16}$ of the partial gear $a^{15}$ meets and is arrested by the feed varying stop $a^{17}$. At this time the holder $b^{18}$ carrying the movable cutter occupies its elevated position, the driver and the outer former having been previously elevated, and the spring $b^{10}$ is permitted to act and cause the feeding mechanism to grasp the wire preparatory to feeding the same. The actuator $D^9$ is then depressed and rotates the feed wheels causing the wire to be fed through the wire guiding groove in the cover plate into position over the inner former, and said actuator is locked as stated in its depressed position after the feeding mechanism has completed its full stroke, and then the holder $b^{18}$ carrying the bender $c^9$ and the cutter $c^{10}$ descend to bend and cut the wire. The staple forming means then acts to form a staple, the inner former is retracted, the driver is permitted to descend and drive the staple from its groove in the outer former, the wire feeding mechanism is separated through the depression of the slide $g$, the stock support is depressed for feeding, and the carriage is moved away from the staple forming means.

I have so far described the carriage $a^{13}$ as being controlled automatically as to its position by variations in the thickness of the stock resting between the top of the horn and any usual foot plate or nose.

Sometimes it is desired, as when the machine is used for "tacking on" outer soles, to employ the machine to drive staples into stock of the same thickness, or it may be desired to drive a number of staples in succession of the same length, and in such case the shoe may be held in the hands of the operator and presented in proper position in contact with and under the end of the nose $b$.

I have shown a modification of my invention provided for this class of work, and I will now refer briefly to Figs. 32-34. In this modification A represents the usual column, and $A^\times$ the base of the column, having a treadle as 200, pivoted at 201, and connected with the lower end of a starting rod 202, which will be provided with a wedge to operate the usual clutch pulleys, the wedge being so shaped that the usual driving pulleys will be unclutched by or through the action of a spring 203, the engaging of the clutches to start the shaft $A^9$ being effected by depressing the left hand end of the treadle 200. The column has ears 204, which receive a suitable rock shaft 205, having attached to its upper end an arm 206, slotted to receive the end of a rod, like rod 51, shown in Fig. 1, with the exception that said rod has a quarter portion between one and its opposite ends that the end of the rod connected with the arm 206 may receive a vertical rather than a horizontal pin, as in other figures hereinbefore referred to, the opposite end of said rod being operatively connected with the carriage $a^{13}$. The rock shaft 205 has also clamped upon it by a suitable clamp screw 207, a hollow arm 208, having at its front end suitable ears 209. The hollow arm receives the shank 210, of a knee piece 212, which may be engaged by the knee, leg, or any other part of the body of the operator. The shank 210 has clamped upon it by a clamp screw 213 a collar 214, having a depending lip 215 provided at its front face, see Fig. 34, with a series of ratchet teeth 216. The depending lip 215 stands on and moves over a plate 217, sustained by a stem 218, which may be clamped by a screw 219, in a split hub 220, at the end of an arm 221, extended from the column A'. The plate 217, has rising from it at one end a stand 222, having a suitable hole to receive the stem of a pawl 223, held in adjusted position by a suitable clamp screw 224, said pawl engaging one of the ratchet teeth 216. The depending lip 215 is acted upon at its rear side by a suitable spring 226, so that the lip is normally pressed against the stationary pawl, but the knee lever may be readily turned to overcome the friction of the spring, and the lever will be locked in either of its extreme positions by said pawl. To determine the extreme positions of this knee lever I have provided suitable stop screws 227, which may be adjusted as represented in Fig. 33, to contact with the ears 209. By adjusting these set screws 227 it will be obvious that the position of the knee lever and of the carriage $a^{13}$ may be adjusted so that the machine will make all staples of a certain length, or if the set screws 227 are so adjusted with relation to the ears 209 that the lever may turn between the ends of said set screws, then the operator has a choice of two lengths of staples, and when the knee lever is in one position one length will be made, and when in the other position another length will be made.

Having fully described my invention, what I claim as new and desire to secure by Letters Patent is:—

1. In a machine of the class described, a carriage, means for moving said carriage automatically as the stock varies in thickness, wire-feeding rolls sustained by said carriage and adapted to engage opposite sides of the wire, means to cause said wire-feeding rolls to grasp the wire, means to separate said wire-feeding rolls to release the wire preparatory to the backward movement of the rolls, and means while said carriage is at rest to rotate said wire-feeding rolls in a forward direction for feeding the wire grasped by said rolls according to the thickness of the stock and to rotate said rolls backwardly, the latter having been separated to release the wire, the backward movement of said feeding mechanism over the wire being completed while said carriage is yet at rest.

2. In a machine of the class described, wire feeding wheels to grasp the wire between them, actuating means to turn said wheels forwardly always to a positively defined point when feeding the wire, means to separate said wheels to release the wire that said actuating means may turn said wheels backwardly into starting position without moving the wire, and a stop controlled automatically as to its position by differences in thickness of the stock to arrest sooner or later the backward movement of the feeding wheels.

3. In a machine of the class described, wire-feeding means comprising wire-gripping means having movement in two directions, means for rendering said gripping means inoperative to grip the wire during movement in one direction, actuating means constructed to control positively the movement of said gripping means in both directions, and means operating to prevent overthrow of said wire feeding means by temporarily locking said actuating means always at the same point in its wire-feeding movement.

4. In a machine of the class described, wire-feeding means comprising wire-gripping means having movement in two directions, means for rendering said gripping means inoperative to grip the wire during movement in one direction, means automatically controlled by the thickness of the stock to determine the amount of inoperative movement of the gripping means, actuating means constructed to control positively the movement of said gripping means in both directions, and means for temporarily locking said actuating means always at the same point in its wire-feeding movement.

5. In a machine of the class described, wire-feeding wheels to grasp the wire between them, actuating means to turn said wheels forwardly to a positively defined point when feeding the wire, means to separate said feeding wheels to release the wire at the end of their feeding movement said actuating means being constructed to rotate the feeding wheels backwardly while the wire remains at rest, a spring to cause said feeding wheels to grasp the wire with a yielding pressure during their feeding movement, a feed varying stop, and means acting automatically as the stock varies in thickness to position said stop to arrest sooner or later the backward movement of the feeding wheels.

6. In a machine of the class described, staple forming means, wire feeding mechanism, a movable stock support, a carriage sustaining said feeding mechanism, and means under the control of the stock support to determine the position of said carriage preparatory to the feeding action of said wire feeding mechanism, means to cause the wire feeding mechanism to grasp the wire, actuating means for causing said wire feeding mechanism to move the wire forwardly during the wire feeding operation, means operable between the forward and backward movement of the wire-feeding mechanism to cause said feeding mechanism to release the wire, and means to then move the wire-feeding mechanism backwardly so that said wire remains stationary during the backward movement of said wire-feeding mechanism.

7. In a machine of the class described, a pair of connected wire-feeding wheels, an actuator operatively connected with said wheels to rotate them positively in both directions, and means for moving the actuator, said means being constructed to arrest and lock said actuator and the feeding wheels at the end of its wire-feeding stroke to prevent any excess of movement of said wheels and of the wire.

8. In a machine of the class described, staple forming means, a pair of connected wire feeding wheels, an actuator operatively connected with said wheels to positively rotate them in both directions, a cam for operating the actuator, said cam being constructed to arrest and lock the actuator and the wire-feeding wheels at the end of the forward stroke of said actuator, thus preventing any excess of movement of said wheels and of the wire.

9. In a machine of the class described, a carriage, staple forming means, means to move said carriage automatically as the stock varies in thickness relatively to said staple forming means, wire-feeding wheels sustained by said carriage, an actuator, means for moving the same to effect the rotation of said wheels positively to feed wire to the staple forming means, according to the thickness of the stock, and means to cause said feeding wheels to release the wire that they may be rotated backwardly over the wire while the same is substantially at rest.

10. In a machine of the class described, staple forming means, wire-feeding wheels, means for causing said wheels to move in unison, an actuator to move positively said feeding wheels to rotate them in a forward direction during the operation of feeding the wire, and actuator-moving means constructed to hold and lock positively said actuator at the end of its stroke and prevent any excess of movement of said feeding wheels.

11. In a machine of the class described, staple forming means, wire-feeding wheels, means for causing said wheels to move in unison, an actuator for driving both said wheels positively to rotate them forwardly during the operation of the feeding of the wire and backwardly over the wire without moving the same, and means to lock said actuator at the end of its stroke in the direction for moving said wheels forwardly to prevent any excess of feeding movement, and means to separate said feeding-wheels to release the wire prior to the backward movement of said feeding-wheels over the wire.

12. In a machine of the class described, a carriage, feeding wheels thereon, means to cause said wheels to grasp the wire to be fed, an actuator arranged to control the movements of said wheels, and means for moving said actuator to rotate said feeding wheels and feed the wire forwardly, said actuator-moving means being constructed to effect the locking of said actuator at the end of the feeding stroke of the feeding wheels to prevent further forward movement of the feeding wheels and over-feeding of the wire.

13. In a machine of the class described, a movable carriage, a shaft therein having fast thereon a gear having a stop, a feed varying stop loosely mounted alongside the gear fast on said shaft and having said stop, feeding wheels deriving their feeding movement from said shaft, an actuator to turn said shaft to feed the wire, and means for changing the position of said feed varying stop according to the thickness of the stock and the length of staple required.

14. In a machine of the class described, staple forming means, a carriage, wire-feeding mechanism mounted on said carriage and comprising two wheels geared together to be turned in unison, means to change automatically the position of said carriage and wheels with relation to the staple-forming means as the stock varies in thickness, said means being arranged to arrest the movement of the carriage toward the staple-forming means according to the thickness of the stock, and means constructed to prevent overthrow for rotating positively both said wheels for feeding the wire according to the thickness of the stock after the carriage has been arrested at the end of its movement toward the staple-forming means.

15. In a machine of the class described, staple forming means, a carriage sustaining wire feeding mechanism, means to separate said wire feeding mechanism to release the wire means to move automatically said carriage away from said staple forming means without feeding the wire after the formation of each staple, means to turn said wire feeding mechanism forwardly to feed the wire as the carriage arrives at the end of its movement toward the staple forming means, and means to stop said carriage sooner or later in its movement towards the staple forming means according to the thickness of the stock.

16. In a machine of the class described, staple forming means, a carriage sustaining wire feeding mechanism, means to move said carriage automatically for a greater or less distance toward and from said staple forming means as the stock varies in thickness, means to actuate said wire feeding mechanism to feed the wire when said carriage is arrested in its movement towards said staple forming means, and means to separate the wire feeding mechanism to remove it from feeding contact with the wire as said carriage is moved away from the staple forming means.

17. In a machine of the class described, staple forming means, a movable carriage provided with an actuator, a shaft having a feed wheel and a pinion, and a second feed wheel having a pinion, means to separate intermittingly said feed wheels to release the wire between them, and means to move said actuator to rotate said shaft and feed wheels in one direction to feed the wire, and in an opposite direction when separated from the wire that said feed wheels may be put into position to again engage the wire and feed the same.

18. In a machine of the class described, a carriage, wire-feeding mechanism mounted thereon, an actuator, a cam, intermediate means moved by said cam to move said actuator to impart to said feeding mechanism a movement in one direction to feed the wire, independent means to effect the return movement of said actuator to reverse the movement of said wire-feeding mechanism, a feed varying stop, and means for automatically controlling the position of the same to determine the extent of return movement of said actuator to thereby vary the length of the next forward movement of the wire-feeding mechanism.

19. In a machine of the class described, a carriage, two feed wheels, gearing uniting said feed wheels, means to cause said feed wheels to clamp the wire between them, an actuator, means to move the same in one direction to move said feed wheels in a direction to feed the wire, means to cause said feed wheels to release the wire, and an independent device to move said actuator in an opposite direction for turning said feed wheels in a reverse direction, putting the same in position to reëngage and feed the wire.

20. In a machine of the class described, staple-forming means, a movable carriage, a feed shaft therein having an attached feed wheel, a gear on said shaft, and a partial gear having a stop, a second feed wheel, means for sustaining the same, and a gear located along side of said second feed wheel, said gears being constantly in engagement, means to cause said feed wheels to grasp the wire preparatory to feeding the same, a toothed actuator mounted in said carriage and engaging the gear upon the feed shaft, a cam, means intermediate said cam and actuator and moved by said cam to move the actuator and with it the feed wheels to a defined point while the wire-feeding mechanism is grasping the wire, means to separate said feed-wheels, a spring to move said intermediate means to return the actuator to its starting point and to reverse the movement of said wire-feeding mechanism to contact with said stop.

21. In a machine of the class described, staple forming means, a carriage provided with feed wheels, a feed shaft carrying one of said feed wheels, means to support and keep the other of said feed wheels pressed normally toward the feed wheel on said feed shaft, a gear fixed on said feed shaft, an actuator in engagement with said gear, means to move said actuator to turn said feed-wheels forwardly and backwardly, forwardly to a defined point to effect the wire-feeding stroke, and backwardly to turn said feed-wheels over but without moving the wire, means to separate said feed-wheels to free the wire between their forward and backward stroke and means to determine the extent of the feeding movement of the actuator by the thickness of the stock.

22. In a machine of the class described, staple forming means, a carriage having wire-feeding mechanism comprising a gear provided with a stop and having an oscillating movement, a coöperating movable feed varying stop, a positioning device for said second-named stop, one of said last-named two elements being carried by the carriage and the other being stationary relatively thereto, means controlled by the thickness of the stock to move said carriage relatively to the staple forming means to position the feed varying stop to contact with the stop of the gear after an inoperative movement of said gear proportionate to the thickness of the stock, and means to impart to said gear its inoperative movement and to thereafter impart forward feeding movement to said wire-feeding mechanism.

23. In a machine of the class described, wire cutting mechanism; staple forming means, a stock support to clamp and caliper the stock, means to depress the stock support for a uniform distance from the underside of the stock whatever its thickness to provide for feeding the stock, a carriage operatively connected with said stock support and movable away from said staple forming means as the stock support is depressed for feeding, and toward said staple forming means as the stock support rises to clamp and caliper the stock, a feed varying stop controlled as to its position by the stock-support, separable wire-feeding rolls, means to move the same positively backwardly and forwardly, means influenced by the position of the feed-varying stop to determine the amount of feed, and means to maintain the rolls in feeding position as the wire-cutting mechanism acts to cut the wire.

24. In a machine of the class described, a stock support to caliper the stock, means to depress the stock support for feeding, a carriage provided with wire feeding mechanism, a feed varying stop movable with said carriage, connecting means between said stock support and carriage to move said carriage to and fro as the position of the stock support is changed owing to variations in thickness of stock, a stationary positioning device coacting with said feed varying stop, means for separating the feeding mechanism to render the same inoperative while the stock support is descending for feeding, and rising again to caliper the stock, means to put the wire feeding mechanism in position to engage the wire, means to actuate said wire feeding mechanism for feeding the wire only after clamping and calipering the stock, and means controlled by the feed varying stop to determine the extent of the feeding movement of the wire.

25. In a machine of the class described, a wire guideway having a lip, a main and an auxiliary bender acting against said wire at opposite sides of said lip, and adjustable means to vary the extent of movement of said auxiliary bender.

26. Staple forming means, a carriage, wire feeding mechanism sustained in said carriage, and comprising connected wire-feeding wheels, and means to rotate said wheels positively in both directions means to separate said wheels for their rotation in one direction; a rockshaft, connections between said rockshaft and carriage for moving the latter and the feeding mechanism with relation to said staple forming means, and means controlled by the thickness of the stock to determine the extent of feeding movement of the feeding rolls.

27. In a machine of the class described, staple forming means, a stock support occupying normally a depressed position, a carriage, connections between said carriage and stock support, a pair of connected wire-feeding wheels mounted on the carriage, means to rotate said wheels positively in both directions, means to separate said wheels for their rotation in one direction means to raise the stock support to clamp and caliper the stock and at the same time move the carriage toward the staple forming means, and means to cause the wire feeding wheels to engage the wire at the proper time to provide for feeding the same for the distance required for the staple next to be made.

28. In a machine of the class described, staple forming means, a stock support occupying normally a depressed position, a carriage, connections between said carriage and stock support, wire feeding mechanism including connected feeding wheels mounted in said carriage, means for separating said wheels when the stock support is depressed, means to raise the stock support to clamp and caliper the stock, and at the same time move the carriage toward the staple forming means, means to cause the wire feeding mechanism to engage the wire preparatory to feeding the same for the distance required for the staple next to be made, means for thereafter actuating said wire feeding mechanism for feeding the wire while the stock support clamps and calipers the stock, and mechanism to offset the wire and then cut the same to point the blank prior to the operation of the staple forming means.

29. In a machine of the class described, staple forming means, a carriage, wire feeding mechanism thereon having a stop, a feed varying stop on said carriage, means to change the position automatically of said feed varying stop as the stock varies in thickness, means to move said feeding mechanism backwardly over the wire until the stop of said feeding mechanism meets the feed varying stop, and to thereafter move said wire feeding mechanism forwardly to a defined point to feed the wire for a length sufficient for the staple required by the stock.

30. In a machine of the class described, staple forming means, a movable carriage provided with a guideway, a holder, means to reciprocate said holder in said guideway, a main and an auxiliary bender to offset the wire, a cutter, and means to clamp said cutter in said holder.

31. In a machine of the class described, staple forming means, a movable carriage, a holder, means to move said holder in said carriage, a cutter and a bender carried by said holder, the bender having a beveled edge located just below the acting edge of said cutter, a second cutter to sustain the wire, and a guide for the wire.

32. In a machine of the class described, staple forming means, a carriage, a holder having a pin provided with an eccentric projection, means to move said holder in said carriage, a cutter and connected bender sustained by said holder, a block having an attached auxiliary bender adapted to be actuated by said eccentric projection, a stationary cutter, and a wire guideway presenting a lip to support one edge of the wire while the wire is being offset.

33. In a machine of the class described, wire cutting mechanism; a nose or foot-plate, staple forming means, a stock-support, means to lower said support to automatically release the stock that it may be fed thereover, means to raise the stock-support that it may clamp and caliper the stock thereon, a movable carriage having wire feeding mechanism, means to sustain and guide said carriage, means to put the wire feeding mechanism out of feeding engagement with the wire after said cutting mechanism cuts the wire, connections between said stock-support and carriage whereby the carriage is moved away from said staple-forming means as the stock-support is depressed, and toward said means as the stock-support rises, and means controlled by the movement of the carriage to determine the extent of the feeding movement of the wire.

34. In a machine of the class described, the following instrumentalities, viz., a nose, staple-forming means, a stock-support adapted to be supported in its rising movement at varying distances from the nose according to variations in thickness of the stock between said nose and stock-support, a carriage carrying wire feeding mechanism, means to cause said mechanism to grasp and then release the wire, connecting devices between said stock-support and carriage to move the latter farther from the staple-forming means as the stock being calipered increases in thickness, means to turn the wire feeding mechanism backwardly for a variable distance according to the thickness of the stock while the feeding mechanism is disengaged from the wire, and means to thereafter actuate said wire-feeding mechanism to feed the wire while the stock-support occupies its stock clamping position.

35. In a machine of the class described, a movable carriage, a cutter fixed with relation thereto, a movable holder having a coöperating movable cutter, a shaft having a feeding wheel, a lever, a second feed wheel mounted thereon, a spring acting normally to keep said feed wheels in engagement with the wire, means to impart forward movement to said feeding wheels and means actuated by said holder to move said lever in opposition to said spring to separate the feed wheels after the completion of their forward feeding movement.

36. In a machine of the class described, a movable carriage, a holder, means to move it in said carriage, a plate having a convexed back and entering a concavity of the holder, a cutter and bender held in said plate, and means to adjust said plate to adjust the cutters.

37. In a machine of the class described, a movable carriage, a holder having a concaved face, means to move said holder in said carriage, a plate having a convexed back seated in the concavity of the holder, a tongue and groove for preventing longitudinal movement of said plate in said holder, a cutter and bender fixed to said plate, and means to turn said plate in the cavity of said holder.

38. In a machine of the class described, wire feeding mechanism, actuating mechanism therefor adapted to lock said mechanism at the end of its feeding stroke, wire cutting mechanism, means to actuate the same, and means to separate the wire feeding mechanism to release the wire as the wire cutting mechanism completes its cutting stroke.

39. In a machine of the class described, wire feeding mechanism, actuating mechanism therefor adapted to lock said mechanism at the end of its feeding stroke, wire cutting mechanism, means to actuate the same, and means to separate the wire feeding mechanism to release the wire as the wire cutting mechanism completes its cutting stroke, and a spring to restore to its starting point the mechanism for actuating the wire feeding mechanism and to turn the wire feeding mechanism backwardly into its starting position.

40. In a machine of the class described, a movable carriage, wire feeding mechanism comprising separable members, and wire cutting mechanism, both mounted upon said carriage, means to actuate the wire cutting mechanism and means to separate the members of the wire feeding mechanism to release the wire as the wire cutting mechanism completes its cutting stroke.

41. In a machine of the class described, a movable carriage, wire feeding mechanism comprising separable members, and wire cutting mechanism, both mounted upon said carriage, means to actuate the wire cutting mechanism and means controlled by the means for actuating the cutting mechanism to separate the members of the wire feeding mechanism to release the wire as the wire cutting mechanism completes its cutting stroke.

42. In a machine of the class described, a movable carriage, wire feeding mechanism and wire cutting mechanism mounted upon said carriage, means for actuating said wire cutting mechanism, and means controlled by said actuating means for causing the wire feeding mechanism to release the wire as the wire cutting mechanism completes its cutting stroke.

43. In a machine of the class described, wire feeding mechanism and wire cutting mechanism, means for actuating said wire cutting mechanism, and means controlled by said actuating means for causing the wire feeding mechanism to release the wire as the wire cutting mechanism completes its cutting stroke.

In testimony whereof, I have signed my name to this specification, in the presence of two subscribing witnesses.

ORRELL ASHTON.

Witnesses:
GEO. W. GREGORY,
EDITH M. STODDARD.